United States Patent [19]

Pruyne

[11] Patent Number: 4,513,934
[45] Date of Patent: Apr. 30, 1985

[54] PIPE-SUPPORTING DEVICE

[75] Inventor: Jerry R. Pruyne, Salt Lake County, Utah

[73] Assignee: Miro Industries, Inc., Midvale, Utah

[21] Appl. No.: 438,735

[22] Filed: Nov. 3, 1982

[51] Int. Cl.³ ............................................. F16L 3/00
[52] U.S. Cl. ........................................ 248/49; 248/65
[58] Field of Search ............... 248/49, 65, 68.1, 74.1, 248/237, 158, 346

[56] References Cited

U.S. PATENT DOCUMENTS

| | | | |
|---|---|---|---|
| 492,593 | 2/1893 | Taylor | 248/74.4 |
| 1,029,139 | 6/1912 | Moltrup | 248/49 UX |
| 1,470,529 | 10/1923 | Gerber | 248/74.4 X |
| 2,336,144 | 12/1943 | Wickstrom | 248/237 |
| 3,119,588 | 1/1964 | Keats | 248/158 |
| 3,482,809 | 12/1969 | McCall | 248/346 X |
| 3,499,413 | 3/1970 | Heard | 248/158 UX |
| 3,843,110 | 10/1974 | Smith | 248/49 X |

FOREIGN PATENT DOCUMENTS 2733361 2/1979 Fed. Rep. of Germany ........ 248/49

Primary Examiner—J. Franklin Foss
Attorney, Agent, or Firm—Mallinckrodt, Mallinckrodt Russell & Osburn

[57] ABSTRACT

A pipe-supporting device adapted to receive and support an exposed pipe on a building roof has a base with a substantially flat bottom for resting on a roof and an upwardly tapered structure secured on and rising from the base to provide an upwardly divergent, substantially V recess having divergent line contacts for receiving the pipe and supporting it above the base. The structure is configured to distribute the weight of the supported pipe substantially equally over the flat area of the base in contact with the roof, and the single line contacts of the V provide this substantially equal distribution of weight regardless of whether the roof is flat or sloped, or regardless of whether the pipe being supported is parallel to the roof or sloped with respect to the roof. Further, the line contacts provide a minimum of resistance to pipe movement so that pipes can easily slide on the device when they expand and contract.

12 Claims, 8 Drawing Figures 4,513,934

PIPE-SUPPORTING DEVICE

BACKGROUND OF THE INVENTION

1. Field

The invention is in the field of supports for exterior pipes on building roofs.

2. State of the Art

It is very common in commercial buildings for there to be various types of pipes which are exposed and run along the top of the roofs of such buildings. These pipes may be connected to air conditioning units mounted on a building roof or to various other service units.

It is currently common practice for these pipes to be supported above the roof surface at intervals along their length by placing blocks of wood between the roof surface and the pipes. With temperature changes, the pipes expand and contract and, partly because of the large contact surface area between a block and the pipe, the block moves with the pipe. After a period of time, the movement of the block against the roof with the weight of the pipe thereon causes damage to the roof, which usually results in a leak and requires expensive roof repair. Even where the blocks are nailed down to the roof, the nails and the wood usually deteriorate in a relatively short time period so that the blocks break loose. Further, wood blocks are difficult to seal so the roof usually leaks about these nail holes.

There is currently available a pipe holder which is mounted on a roof and has a pulley or roller on which the pipe rests and rolls as it expands and contracts. While this prevents problems due to contraction and expansion of the pipes, it is necessary that holes be made in the roof for mounting purposes, and the device is expensive. Where many holders are required, they can easily cost more than a number of later roof repairs. Thus, the roller solution to the problem has not achieved a great deal of commercial success.

SUMMARY OF THE INVENTION

According to the invention, a pipe-supporting device adapted to receive and support an exposed pipe on a roof has a base with a flat bottom for resting on the roof, and upwardly tapered structure secured on and rising from the base to provide an upwardly divergent, substantially V recess having divergent line contacts for receiving the pipe and supporting it above the base. The supporting structure is made up of walls, parts of which divergently recede from the respective line contacts at opposite arms of the V to provide mutually opposite, upwardly tapered towers. Other parts of the walls slope upwardly from the base toward and meet with the lower ends of the receding walls, and still other parts of the walls join the receding wall parts of the respective towers. The lower edges of the other wall parts and the still other wall parts form a symmetrical periphery at the base which substantially evenly distributes the pipe load over the flat surface area of the base.

In a preferred embodiment of the invention, the base is square and the lower edges of the wall parts forming the pipe-supporting structure also form a square where they attach to the base. The receding wall parts of each line contact and the upwardly sloping other wall parts are triangular, each set of the former providing two sides of a pyramid and each of the latter having its apex at the lower ends of the line contacts, i.e. the vertex of the V, and its sides joined to the lower sides of the receding wall parts. The still other wall parts are substantially triangular and extend from the base upwardly, joining the receding wall parts of the respective towers. This construction provides pipe-supporting edges of V formation diverging upwardly from the base, and walls which distribute the weight of the pipe evenly over the square perimeter of the pipe-supporting structure at its attachment to the base.

When the device having this preferred form is integrally molded from plastic with hollow pyramids, the substantially flat base extends outwardly from the walls of the supporting structure to form a square base with a square cutout area beneath the pyramids and upwardly sloping walls of the supporting structure. The edges and corners of the base are rounded so that they will not gouge the roof surface if the device moves in relation to the roof.

The advantages of such structure are that the line contact with the pipe provide very little resistance to pipe movement so that in many instances, the pipe will slide within the holder upon expansion and contraction rather than moving the supporting device. This lack of movement of the device relative to the roof prevents damage to the roof. Further, in those instances where the device does slide relative to the roof, the substantially even distribution of weight over the area of the base and the rounded edges and corners of the base prevent damage to the roof. In most cases where the device does move, the movement is less than would otherwise be the case because some sliding of the pipe on the line contact will also occur.

In some instances, such as on sloping roofs, it may be desirable to secure the device to the roof, such as by nailing, and, for such instances, holes are provided in the base at the respective corners thereof to receive nails and the outer edges of the base are turned up to form an upstanding peripheral wall for the base. This provides an area over the base in which a sealing composition, such as roof tar, can be placed to seal the areas about the nails. Also, since the device may have a tendency to squeeze roof tar or other sealant out from under the base, it is preferred in instances where nails are used, to provide wells in the base about the respective nail holes for holding the sealing composition in contact with the roof for sealing purposes.

It is also preferred that the devices be provided with means to allow several of the devices to be stacked, where needed, to support pipes at varying distances above a roof, and to provide means for closing the top of the V over the pipe to insure that the pipe remains in the holder.

DRAWINGS

In the accompanying drawings, which illustrate the best mode currently contemplated for carrying out the invention:

FIG. 1 is a perspective view of a fragmentary portion of the flat roof of a building on which an exposed pipe is supported by several devices of the invention placed in position between the pipe and the roof;

FIG. 2, a perspective view of one of the pipe supporting devices shown in FIG. 1 drawn to a considerably larger scale;

FIG. 3, a top plan view of the pipe-supporting device of FIG. 2;

FIG. 4, a vertical section taken on the line 4—4 of FIG. 3;

FIG. 5, a bottom plan view of the device of FIG. 2;

FIG. 6, a fragmentary vertical section taken on the line 6—6 of FIG. 3.

FIG. 7, a fragmentary side elevation of the tops of the towers of a device as shown in FIG. 3, showing how a pipe-holding collar may be installed; and FIG. 8, a fragmentary vertical section through a peripheral wall of a device as shown in FIG. 3, showing how two devices interlock when one device is stacked on another.

DETAILED DESCRIPTION OF THE ILLUSTRATED EMBODIMENT

Figure 1:
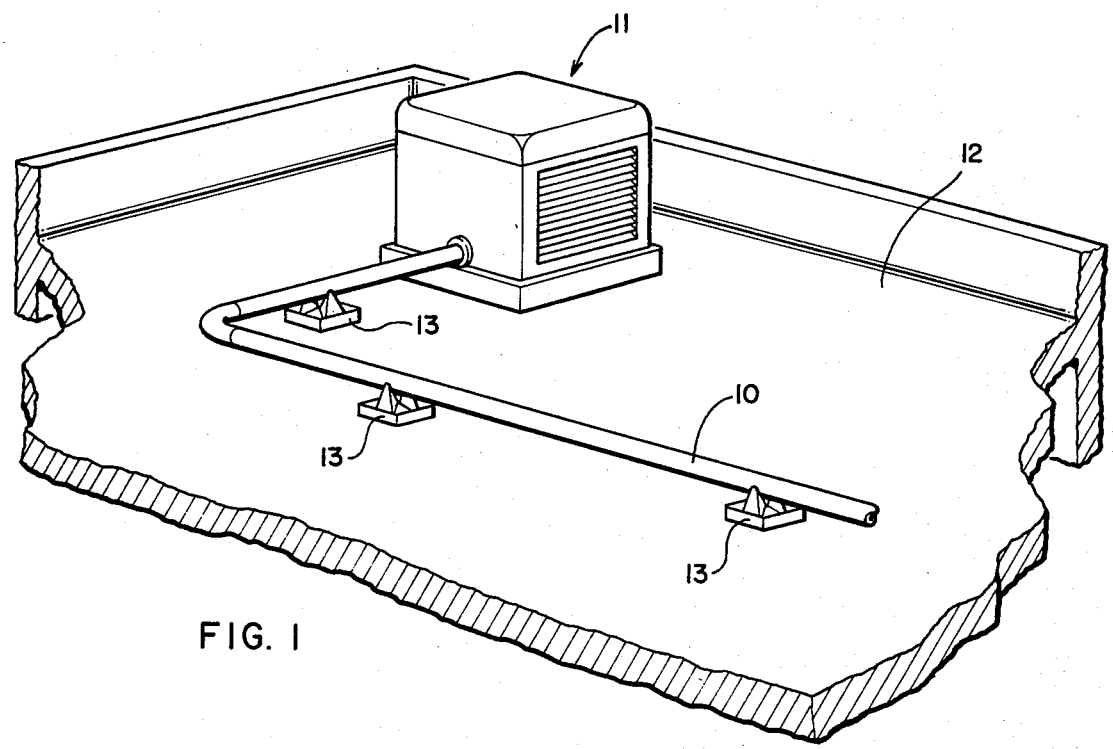
Figure 6:
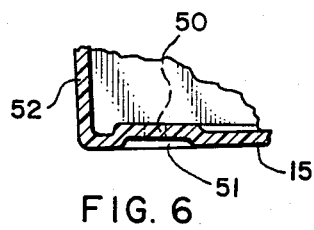

It is very common in commercial buildings to have a number of exposed pipes supported above the roof of the building. FIG. 1 shows a common installation in which a pipe 10 extends from an air conditioning unit 11, mounted on roof 12, across the roof to a location (not shown) where it extends over the side of the roof, through the roof, or is connected to other roof-mounted equipment. Pipe supporting devices 13 of the invention are positioned on roof 12 to support pipe 10 as it extends along the roof. The number of supporting devices needed depends upon the type of pipe supported, its size, weight, and the material from which it is made, as well as its configuration on the roof.

Figure 2:
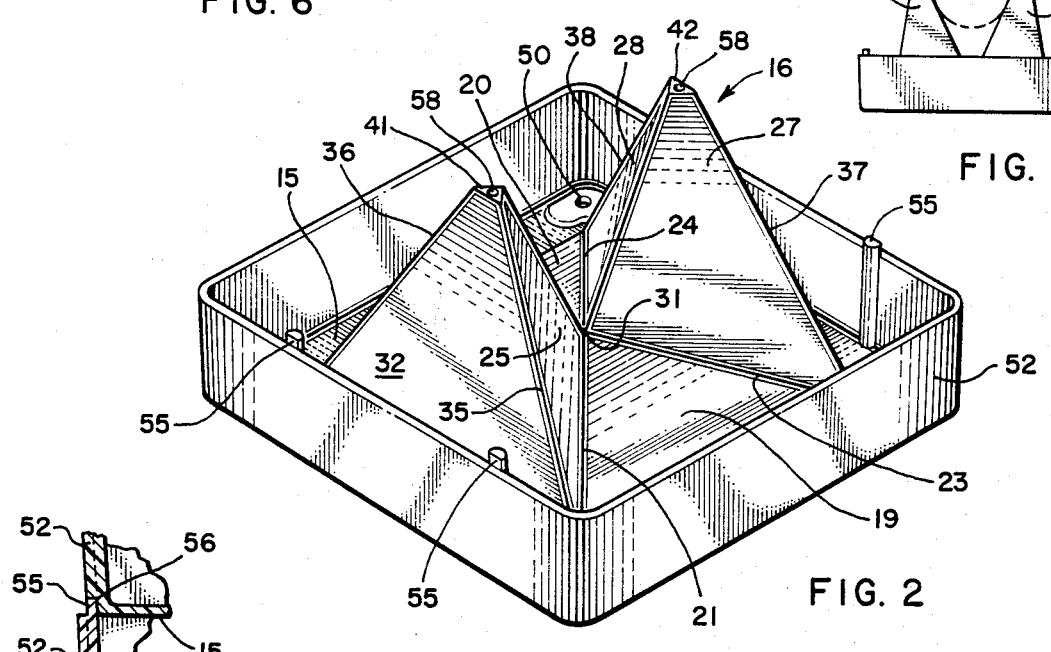
Figure 4:
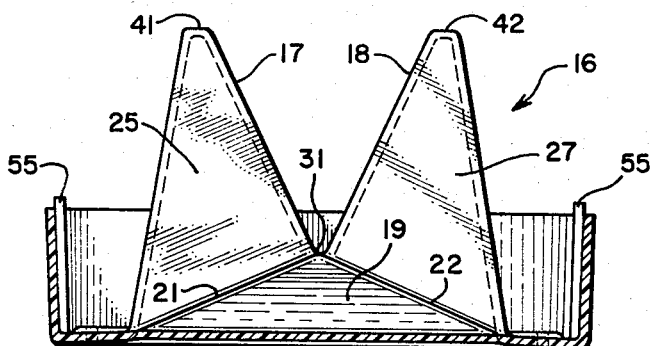
Figure 5:
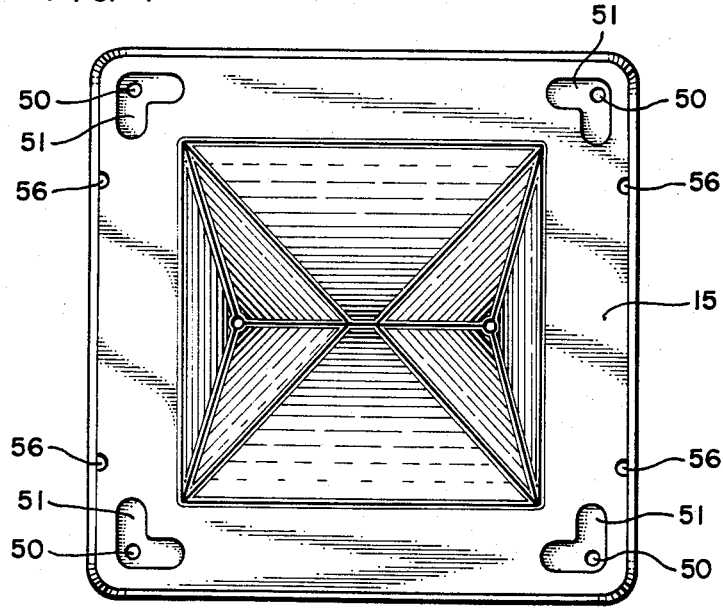

As shown, in the presently preferred embodiment of the invention, each pipe-supporting device 13 includes a substantially square base 15 from which an upwardly tapered pipe-supporting structure, shown generally as 16, FIGS. 2 and 4, extends.

The pipe-supporting structure 16 is constructed to provide divergent line contacts 17 and 18, which form a substantially V recess for receiving, intermediate its depth, the pipe to be supported and for providing substantially uniform distribution of the weight of the pipe over the area of the base 15 that is in contact with the roof. The vertex of the V is located above the level of the base, and walls 19 and 20 slope upwardly from the base 15 to meet with the lower ends 21, 22, 23, and 24 of sets of walls 25 and 26 and 27 and 28 which divergently recede from line contacts 17 and 18, respectively, to form upwardly tapered towers. It will be noted that line contacts 17 and 18 are formed by the intersection of walls 25 and 26 and 27 and 28, respectively. The walls 19 and 20 in this illustrated embodiment of the invention are substantially triangular in shape, with their bases 29 and 30 respectively secured to the base 15 of the device and their apices coming together at the vertex of the pipe-supporting V as indicated at 31. Walls 32 and 33 extend upwardly from base 15 and meet with receding walls 25 and 26, and 27 and 28, respectively, along edges 35, 36, 37, and 38 respectively. Their bases 39 and 40, respectively, join base 15. With this arrangement, the tapered towers take the form of a portion of a pyramid. The towers may extend to a point, or, as shown, may be cut off and have small flat areas 41 at their tops. While walls 32 and 33 are shown as sloping, and some slope is preferred for ease of releasing the device from the mold when molded, such slope is not required and these walls could be vertical.

The structure described forms a pipe supporting structure which is square where it is connected to the device base, and provides for even distribution of the pipe weight along joining edges 29, 30, 39 and 40. The substantially flat bottom of base 15 extends outwardly from the securement of the supporting structure to form a substantially flat peripheral area which contacts the roof surface. The flat area of base 15 does not extend under the supporting structure 16 when the device is of one-piece molded construction. Therefore, the area of contact with the roof surface is only the peripheral flat area. This area is designed to provide sufficient area to spread the weight of the pipe supported by the device over the roof so that the weight per unit area against the roof is of a value less than the breaking point or tensil strength of the roof surface. Also, the edges of the base 15 are rounded, as are the corners, and may be turned up so that the edges will not gouge the roof surface if the device slides along the roof.

When the device is made of a plastic material, it is preferred that the substantially flat portion of the base 15 actually slope slightly downwardly, as shown in FIG. 4, from its attachment to the supporting structure to its outer edge. This slope is usually in the order of 2-3 degrees so the base is considered as substantially flat, but such slope has been found beneficial because on hot days, as the plastic material becomes hot, the flat portion of the base tends to soften to some extent and the inner portion of the base where attached to the supporting structure tends to carry more of the weight. The slight slope alleviates this problem and keeps the base substantially flat with a substantially even weight distribution.

In some instances, it may be desirable to secure the device to a roof, and for this purpose, holes 50 are provided in the corners of base 15 through which nails may be driven into the roof. Such securement of the device is never recommended on a flat roof, but is advisable on a roof of 1-2 pitch or more to keep the device from sliding along the slope of the roof and out of its desired placement with respect to the pipe it is supporting. While nails are preferred for fastening purposes, other fasteners could be used.

Since under some circumstances on some types of roofs the weight on the base 15 has a tendency to squeeze out soft material such as tar from between the actual roof surface and the device, wells 51 are provided to trap some of the soft sealing material about holes 50. Thus, even though tar or other sealing material may be squeezed out from between the device and roof surface, tar will remain about holes 50 and any nails that may extend therethrough. In addition, peripheral sides 52 are provided to form a "tar" bucket for tar or other sealing material to be placed and held about the nails to ensure a good seal.

Figure 8:
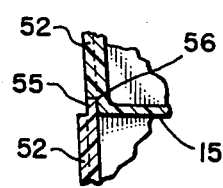
Figure 3:
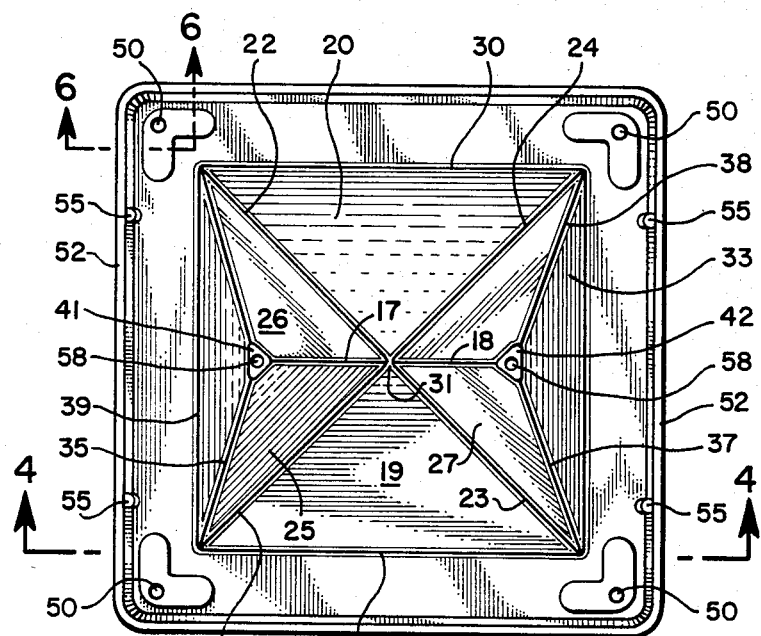

The height at which pipes are carried above a roof surface varies considerably. Therefore, to avoid having to make a large variety of devices with different heights, it is preferred that the device be made so that several devices can be stacked to provide additional height. For this purpose, pins 55 are provided extending upwardly along two opposite peripheral sides 52 of the device. The pins 55 extend above the top of the wall as shown in FIG. 4. Mating holes 56 are provided in the base of the device so that two or more devices may be easily stacked with pins 55 received in holes 56, as or shown in FIG. 8, to increase the height above the roof at which a pipe is supported.

Figure 7:
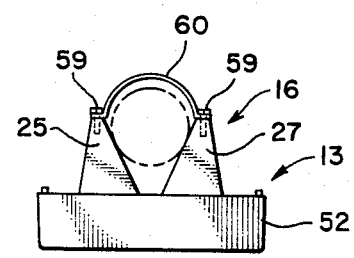

For certain types of pipes in certain states, it is required that the pipe be held in place by a collar. This is required, for example, by the building code in California for pipes which carry natural gas. For this purpose, indentations 58 are provided in the flat areas at the top of the towers to receive screws 59, FIG. 7, which hold in place collar 60. The collar may be of various shapes and made of various materials. Preferably, the collar is made of molded plastic material similar to that of the device itself. Also, as shown in FIG. 7, it is preferable that the collar does not clamp tightly about the pipe to be held, but merely closes the top of the pipe receiving V so that the pipe cannot escape therefrom. This arrangement allows the pipe to rest at two points in the V and leaves it free to slide within the device. Indentations rather than actual holes are preferred because screws can easily be driven through the plastic at the bottom of the indentations, if needed, and as in most cases, if screws are not needed, the holes are sealed so that moisture cannot pass through the holes and build up beneath the device.

One embodiment of pipe-supporting device built as shown has a six-inch square base. The overall height of the device is three and three-eighths inches and the pipe supporting V is two and three eighths inches deep. The line contacts of the V extend outwardly at an angle of 60°. The flat area of the base in contact with the roof is thirty-six inches. With such arrangement, pipes varying in diameter from three-quarter inch to two and one-half inches will easily fit into the V and be held there. The V not only supports the pipe, but also holds it against moving laterally out of the device. Any lateral movement will move the base also. With smaller pipes, a number of pipes may be bound together and supported by the device. For example, five three-quarter inch pipes may be easily held in the V of the device just described. In this preferred embodiment, the wells 51 about the holes 50 are one-sixteenth inch deep.

The angle of the V, along with the size of the device, may vary so that it can be adapted to hold various ranges of different size pipe. It is desirable that the pipe supported be held in the V by two point contact, i.e. one point of contact between each line contact of the V and the pipe. This provides minimum resistance to sliding of the pipe. It is also desirable that the pipe fit into the V to an extent so that the pipe cannot easily slide laterally out of the V, either through lateral movement of the pipe, or through accidental movement of the device.

The provision of a single V with line contacts for the pipe, in addition to reducing sliding resistance for the pipe, allows the device to be used on sloping roofs or with sloping pipe and still maintain substantially equal weight distribution of the pipe over the flat base area of the device.

It is presently preferred that the device be molded of a polyvinylchloride plastic material (PVC). This material is preferred because it resists deterioration from exposure to ultraviolet light, i.e. sunlight, it meets the requirements for a Class A fire retardant, and is very strong. A PVC device with three thirty-seconds inch wall thickness and of the size described above has been found satisfactory to support pipes up to 80 pounds. Of course, other material may be used and may require different thicknesses for similar loads.

It has been found that the edges of the base should be at least about one-eighth inch high in order to avoid gouging the roof. Thus, if the base of the material is less than one-eighth inch thick, and sides are not provided to form a tar bucket, the edges should be turned up to provide at least the one-eighth inch around the edges.

While a particular geometric structure has been described and illustrated, it should be understood that any structure providing substantially line contacts and substantially equal weight distribution over the base of the device could be used.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A pipe supporting device adapted to receive and support an exposed pipe on a roof, said device comprising a base having a flat bottom for resting on the roof; and upwardly tapered structure secured on and rising from said base to provide an upwardly divergent, substantially V recess having divergent line contacts for receiving the pipe and supporting it above said base, said line contacts minimizing contact area and friction between the pipe and said device, and said structure being made up of wall means, parts of which divergently recede from the respective line contacts at opposite arms of the V to provide mutually opposite, upwardly tapered towers, other parts of which slope upwardly from said base toward and meeting with the lower ends of said receding wall parts between said line contacts, and still other parts of which join the receding wall parts of the respective towers, said other wall parts and said still other wall parts having lower ends forming a symmetrical periphery at said base which substantially evenly distributes the pipe load on the base and on the roof.

2. A pipe-supporting device according to claim 1, wherein the lower edges of the wall parts forming the pipe-supporting structure form a square where they attach to the base, wherein the receding wall parts of each line contact are substantially triangular and provide two sides of a pyramid, wherein the outer wall parts are substantially triangular having their bases secured to the device base and their apices joined at the lower converging ends of the line contacts, and wherein the still other parts of the wall are substantially triangular with their bases secured to the device base and their remaining sides joined with the respective receding wall parts so the respective towers are in the form of three sided pyramids.

3. A pipe-supporting device according to claim 2, wherein the respective pyramid towers at the top of the line contacts are flattened, and an indentation is provided in each such flattened area adapted to receive a screw for holding closing means in place across the open end of the pipe-receiving recess.

4. A pipe-supporting device according to claim 1, wherein a hole is provided through each corner of the base for receiving a fastener therethrough when it is desired to secure the device to a roof.

5. A pipe-supporting device according to claim 4, wherein a well is provided in the underside of the base surrounding each hole, such wells being adapted to trap sealing material therein which might otherwise be squeezed away from the area about the holes under the base.

6. A pipe-supporting device according to claim 5, wherein peripheral walls are provided about the base to hold sealing material placed about the holes and the fasteners passing therethrough about such fasteners for sealing purposes.

7. A pipe-supporting device according to claim 6, wherein the fasteners are nails pounded into the roof.

8. A pipe-supporting device according to claim 1, wherein the edges of the base are rounded to prevent gouging of a roof surface when the device moves across the surface.

9. A pipe-supporting device according to claim 1, wherein means are provided for holding one device in stacked position on another.

10. A pipe-supporting device according to claim 9, wherein the holding means comprises pins extending upwardly from the base, and receiving holes in the base which receive such pins when one device is mounted above another.

11. A pipe-supporting device according to claim 10, wherein the device is molded as a single piece from a plastic material.

12. A pipe-supporting device according to claim 11, wherein the plastic material is a polyvinylchloride.

* * * * *